UNITED STATES PATENT OFFICE.

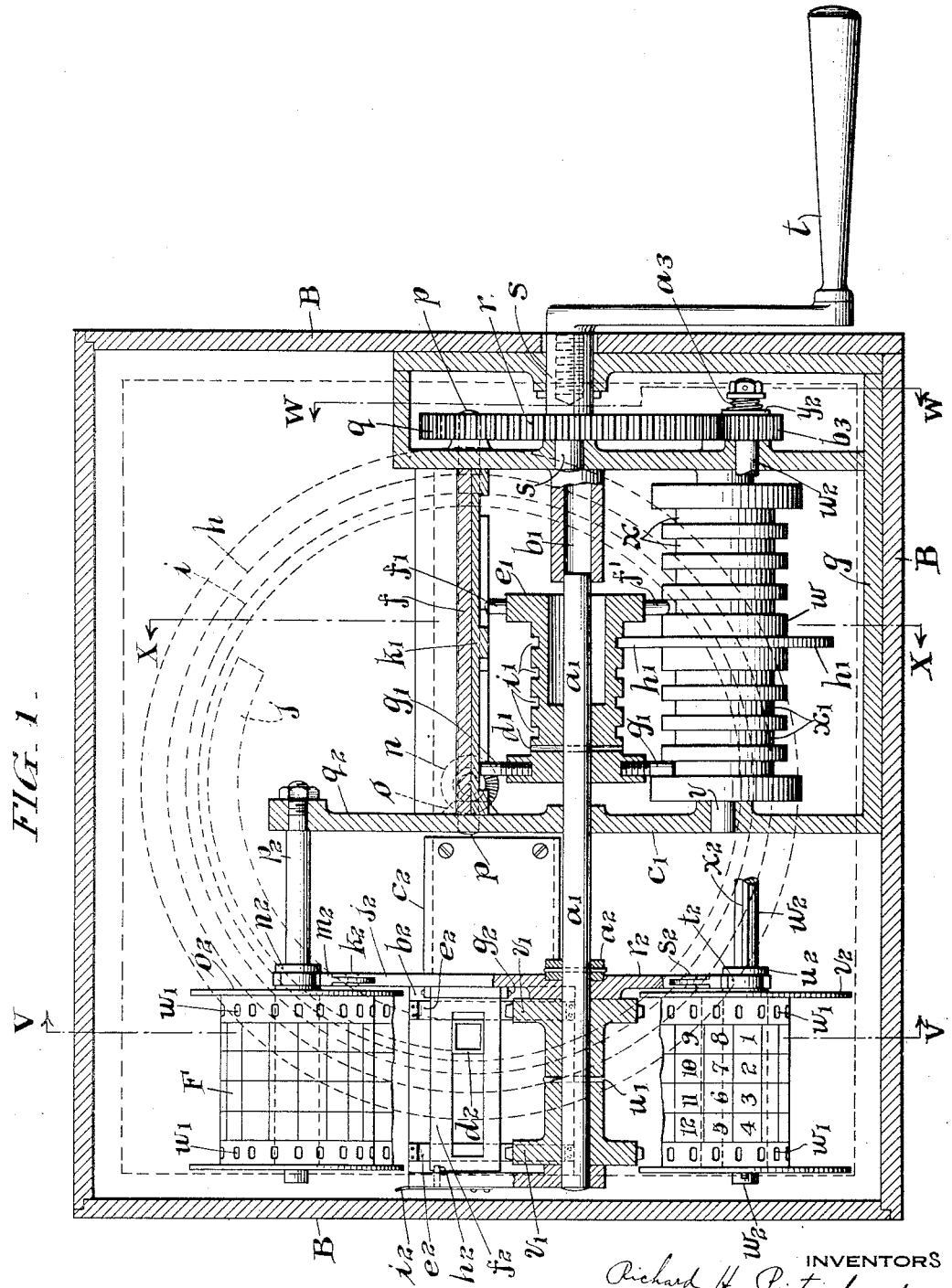

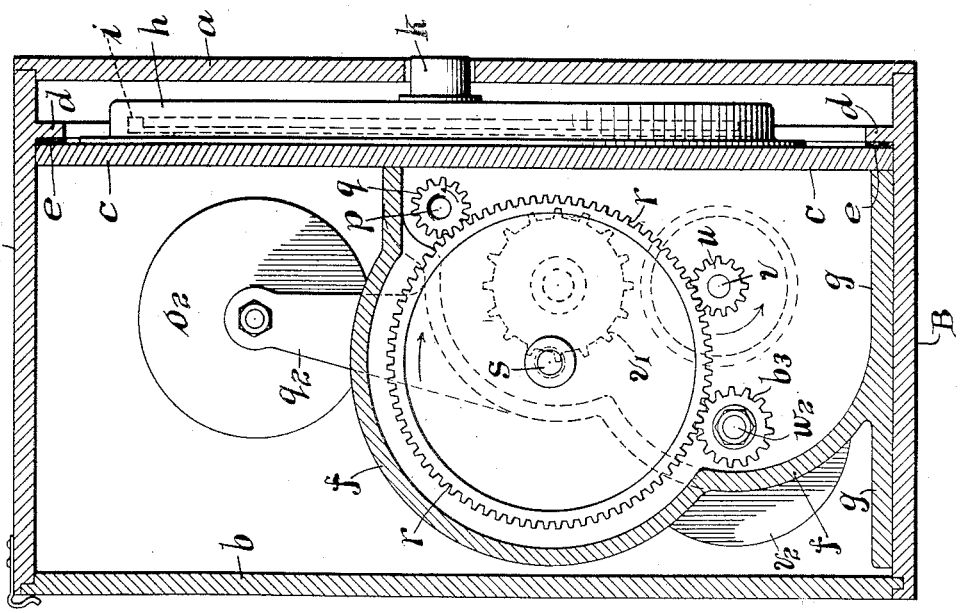
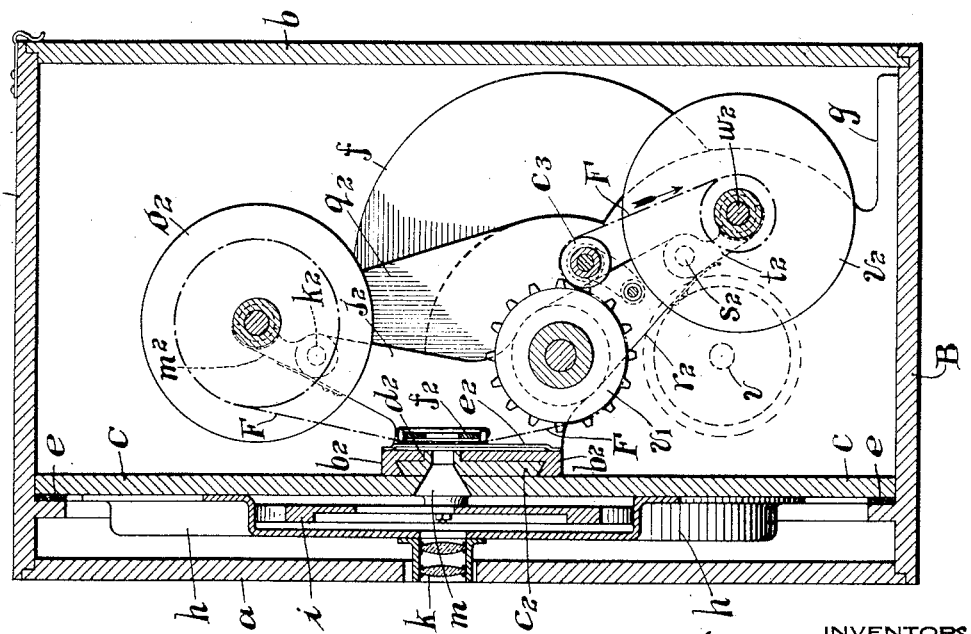

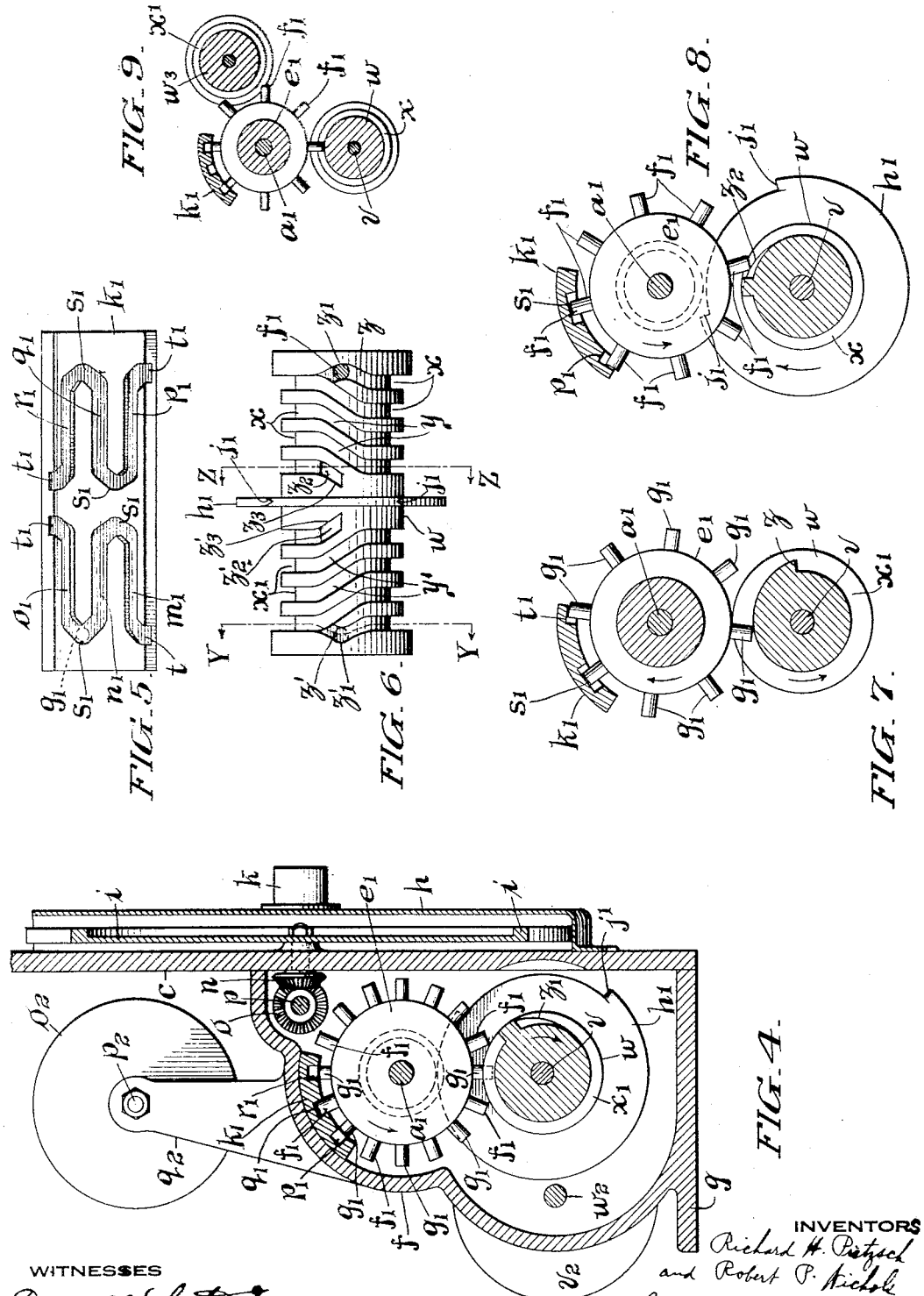

RICHARD H. PIETZSCH AND ROBERT P. NICHOLS, OF PHILADELPHIA, PENNSYLVANIA.

KINETOGRAPHIC APPARATUS.

1,164,859.     Specification of Letters Patent.     Patented Dec. 21, 1915.

Application filed October 22, 1914. Serial No. 867,949.

*To all whom it may concern:*

Be it known that we, RICHARD H. PIETZSCH and ROBERT P. NICHOLS, citizens of the United States, of the city of Philadelphia, State of Pennsylvania, have invented new and useful Improvements in Kinetographic Apparatus, of which the following is a specification.

Our invention relates to kinetographic apparatus suitable for a projector of motion pictures and for a motion picture camera for making photographic exposures in a kinetographic series.

It is the object of our invention to provide apparatus of the character referred to in which is used a film or other picture unit support in which the picture units in the kinetographic series are disposed in neighboring rows across the film.

To these ends we have provided apparatus by which the film and the lens are moved intermittently and transversely with respect to each other, then longitudinally with respect to each other, and then again transversely, and so on until all of the picture units of the kinetographic series have been brought in succession into operative relation with respect to the lens or optical axis. For the transverse movements we employ a variable pitch screw feed, with means operative at the end of each transverse movement to feed the film lengthwise to bring the next row of picture units into operative relation. And in conjunction with such apparatus we employ means for preventing longitudinal movement or oscillation of the film except at desired times; and we provide also means for preventing transverse oscillation or movement during the time that the film should remain at rest during its transverse movement.

Our invention resides in apparatus of the character hereinafter described.

For an illustration of one of the forms our invention may take, reference is to be had to the accompanying drawings, in which:

Figure 1 is a vertical sectional view, some parts in elevation, through the apparatus. Fig. 2 is a vertical sectional view taken on the line V—V of Fig. 1. Fig. 3 is a vertical sectional view, parts in elevation, taken on the line W—W of Fig. 1. Fig. 4 is a fragmentary vertical view, some parts in elevation, taken on the line X—X of Fig. 1. Fig. 5 is a plan view of a part coöperating to prevent longitudinal movement or oscillation of the film. Fig. 6 is a plan view of the variable pitch screw feed. Fig. 7 is a cross sectional view, some parts in elevation, taken on the line Y—Y, Fig. 6, with other parts associated therewith. Fig. 8 is a cross sectional view on the line Z—Z, Fig. 6, with other parts associated therewith. Fig. 9 is an illustration of a modified arrangement of the variable pitch screw feed mechanism.

Referring to the drawings, B is a suitable camera or projector box having the front wall $a$ and rear wall $b$.

Within the box B is the plate $c$ held in position with respect to the lugs or projections $d$ on the box B, light proofing material $e$ intervening between the projections $d$ and the plate $c$. The plate $c$ forms one wall of a casing $f$ having the lower wall $g$ resting against or secured to the bottom of the box B. Secured to the front side of the wall $c$ is the metal spinning $h$ forming a housing for the rotary shutter $i$ having the arc shaped opening $j$ which, during rotation of the shutter, allows for a predetermined suitable time free light passage through the lens $k$, which may be for convenience mounted upon the member $h$, and through the aperture $m$ in the plate $c$. The shutter $i$ is driven by the bevel gear $n$, journaled in the plate $c$, and meshing with the driving bevel gear $o$ secured upon the shaft $p$, which is in turn driven by the pinion $q$ driven by the hand crank $t$.

The gear $r$ also drives the pinion $u$ secured upon shaft $v$ upon which is secured the variable pitch screw feed $w$. This screw feed $w$ has two variable pitch screw threads of which the channels $x$ of one half have throughout the greater portion of a circumference no pitch longitudinally of the member $w$, neighboring channels $x$ being connected by the inclined or curved channel portions $y$ which are the only portions having a pitch. At its one end the variably pitched channel $x$ decreases in depth, as indicated by the rising surface $z$ which rises to substantially the height of the ribs between the channels $x$. And the channel of decreasing depth at the rising surface $z$ has the lateral deflection $z^1$. At its other end the variably pitched slot $x$ rises in a similar surface $z^2$ and there is a lateral deflection $z^3$. The other side of the member $w$ is symmetrical, there being similar slots $x'$ connected by the inclined or curved slots $y'$, one end of the continuous slot $x'$ having a lateral deflection $z'^1$, the bottom of the slot rising at $z'$; and at the other end of the slot there is a lateral deflection $z'^3$ with the rising bottom $z'^2$.

Disposed parallel with the shaft $v$ is the longitudinally movable shaft $a^1$ provided at its one end with the guiding hole $b^1$ and shaft $a^1$ passes through the wall $c^1$ of the casing $f$. Secured to the shaft $a^1$ by pin $d^1$ is a pin wheel $e^1$ carrying at its one end a circumferential series of pins $f^1$ and at its other end a similar series $g^1$, the pins $f^1$ at one end being staggered or alternated in angular position with the pins $g^1$ at the other end of the wheel $e^1$.

Driven with the variable pitch screw feed $w$ is the locking disk or circular rib $h^1$ adapted to engage in succession in the circular channels or slots $i^1$ in the wheel $e^1$. The disk $h^1$ is cut away between the tapering points $j^1$ to a depth to allow longitudinal movement of the wheel $e^1$ when the member $h^1$ is in certain angular positions.

Carried on the inside of the casing $f$ is an arc shaped plate $k^1$ having two sets of slots, one set comprising the three longitudinal slots $m^1$, $n^1$, $o^1$ and the other comprising the three parallel slots $p^1$, $q^1$, and $r^1$. While one set of these slots will suffice, we may use two sets as shown. The slots of each set are joined by two suitably curved or slanting slots $s^1$, as best indicated in Fig. 5, and each complete slot having pin entry and exit terminals $t^1$.

Secured upon the shaft $a^1$, as by pin $u^1$, is a film feeding sprocket wheel $v^1$ having the usual teeth or projections engaging in the marginal perforations $w^1$ in the film F which, as shown in Fig. 1, has the picture units arranged in successive transverse rows. For example, one row comprises four picture units, (though it will be understood that our invention is not limited to this number), the individual picture units being indicated at 1, 2, 3 and 4, this indicating also their order of sequence in the kinetographic series. The next picture unit in the series is 5 which is in the next row with units 6, 7 and 8, the series continuing in the next row at 9, 10, 11, 12.

Between the sprocket wheel $v^1$ and the collar $a^2$ secured upon shaft $a^1$ is the frame $b^2$ dove-tailed for transverse movement upon the plate $c^2$ secured upon the plate $c$. The light aperture $m$ extends through the plate $c^2$, which latter has the rectangular extension $d^2$, through which the aperture $m$ continues in size and shape substantially that of a picture unit, the member $d^2$ extending into a transverse slot in the frame $b^2$; and upon the member $b^2$ are the two resilient film guides $e^2$ between which and the door or plate $f^2$ the film F is confined during its movement. The door frame $f^2$ is pivoted to the frame $b^2$ at $g^2$, and a latch $h^2$ on the end of the leaf spring $i^2$ serves to hold the pressure plate $f^2$ in place. The pressure plate $f^2$ has a transverse aperture as shown in Fig. 1, which aperture is substantially similar to that in the member $b^2$ into which the extension $d^2$ projects, such aperture in the member $f^2$ being employed particularly during projection of motion pictures, in which case a suitable light source will be placed to the right of the member $f^2$ as viewed in Fig. 2. The frame $b^2$ has the upwardly projecting arm $j^2$ to which is pivoted at $k^2$ a hooked member $m^2$ which engages the hub $n^2$ on the film storage reel $o^2$ which is moved by member $m^2$ transversely on the rod $p^2$, supported in the arm $q^2$. The frame $b^2$ has also a downwardly extending arm $r^2$ to which is pivoted at $s^2$ a hooked member $t^2$ which engages the hub $u^2$ of the film take-up reel $v^2$ which is movable longitudinally of the shaft $w^2$ and rotated thereby by the spline $x^2$ thereon. The shaft $w^2$ is driven by the friction disk $y^2$ pressed by spring $a^3$ against the face of the pinion $b^3$ driven by the gear $r$.

The operation is as follows: The gear wheel $r$ is turned in a clockwise direction, as viewed in Fig. 3, thereby rotating the shaft $v$ and the attached members $w$ and $h^1$ in a counterclockwise direction as viewed in Figs. 3, 4, 7 and 8. This counterclockwise rotation of the member $w$ causes the lowermost pin $f^1$, Fig. 8, to enter the slot $x$ at $z^2$, the wheel $e^1$ being rotated in clockwise direction at this stage by action hereafter described. By the time this rotary movement of wheel $e^1$ has been completed, the aforementioned pin $f^1$ will have been rotated to position to fully engage in its slot $x$, and as the member $w$ rotates, while the wheel $e^1$ is confined against any rotary movement, as later described, the first inclined or curved portion $y$ of the slot $x$ will engage the pin $f^1$ and cause it to move one space to the right, as viewed in Fig. 6, and then the remainder of the circumference of the channel $x$ at the end of the first inclined slot $y$ having no pitch, the wheel $e$ will again remain stationary, as to transverse movement, until the next inclined or curved slot $y$ engages the pin $f^1$ when it is stepped another space; and so on for four successive steps or spaces. This stepped transverse movement moves the shaft $a^1$ four spaces transversely, thus carrying the film and the other parts carried by the frame $b^2$ in four consecutive steps toward the right, as viewed in Fig. 1. Each of these steps is equal to the transverse width of a picture unit on the film F. During the time that the slot $y$ is engaging the pin $f^1$ the locking plate $h^1$ is disengaged from the wheel $e^1$, but immediately a transverse step of the wheel $e^1$ is completed, the member $h^1$, by its wedged or pointed end $f^1$, enters a circumferential channel or slot $i^1$ in the wheel $e^1$, positively locking it against any transverse movement until the next slot $y$ engages the pin $f^1$. By this means the member $h^1$ locks the wheel $e^1$ and therefore the film and other parts movable transversely therewith. And while there may be wear upon the slots $x$, $y$ and the pins on wheel $e^1$, the member $h^1$ insures that the transverse step movements shall begin and end at predetermined unaltering points or positions. When the pin $f^1$ has traversed the entire slot $x$, it rises on surface $z$ in the bottom of the slot $x$ at its right end and simultaneously the next pin $g^1$ enters the slot $x'$ at $z'^3$, such pin $g^1$ during the partial rotation of the wheel $e^1$ descending the inclined surface $z'^2$ fully into the slot $x'$ whereupon, by operation similar to that above described, the wheel $e^1$ will be stepped four spaces to the left. The wheel $e^1$ is rotated half the angular distance between two neighboring pins $f^1$ due to the forcing of a pin $f^1$ through a connecting slot $s^1$ in plate $k^1$, and this movement through a slot $s^1$ is caused by another of the pins $f^1$ passing through the deflected slot $z^1$ in member $w$. But in this partial rotation of the wheel $e^1$, the shaft $a^1$ has been rotated through like angle and therefore the film feeding sprocket $v^1$ has been rotated through like angle with resultant pulling down upon the film F a distance equal to the height of a picture unit, so that a second row of picture units is brought into the optical axis or before the lens, and then the step movement to the left, referred to, occurs so that the film is brought successively to rest for each picture unit in such next row. And as the pin $g^1$ finishes its traverse of the slot $x'$ it rides up upon the surface $z'$, thus causing another partial rotation of the wheel $e^1$ and the shaft $a^1$ and a further movement of the film F longitudinally a distance equal to the height of a picture unit. And simultaneously the next pin $f^1$ enters the slot $x$ at $z^3$ and a further four step movement to the right follows. And so on, the film partakes of four transverse steps as to the right, then one longitudinal step, then four transverse movements in opposite direction, then one further longitudinal step, then four transverse steps to the right, so that all the picture units of the kinetographic series are brought in succession into operative relation with the lens $k$. During this rotation of the gear $r$ by the handle $t$ the shutter $i$ is rotated through the gearing described, and the slot $j$ is of such arcuate length and so positioned that it allows passage of light between the lens and film, or film and lens, only when the film F is at rest in any of its positions.

To insure locking of the shaft $a$ and therefore the film feeding sprocket $v$ against any rotary movement or vibration during any part of the transverse movement of the shaft $a^1$ and parts attached thereto, the slotted plate $k^1$ is provided.

As seen in Figs. 4, 7 and 8, while the pin $g^1$ or $f^1$ is engaging in a slot in member $w$ another pin $g^1$ or $f^1$, or plurality of them, at other parts of the wheel $e^1$, are engaging in the plate $k^1$. A given pin as $g^1$ will engage the slots $m^1$, $n^1$ and $o^1$ in succession. As stated, one set of these slots in the plate $k^1$ will suffice, though a second set is shown for the second set of pins $f^1$. Each successive pin $g^1$ enters the slot $m^1$ at its lower left end $t^1$, and during the four step movements to the right passes longitudinally of the slot $p^1$ toward the right, then as the wheel $e^1$ is stepped around one space, as above described, it passes through the connecting slot $s^1$ to the right end of slot $n^1$, then during the next four steps of movement of wheel $e^1$ to the left, the pin moves along the slot $n^1$ to the left, then at the next angular movement of the wheel $e^1$ passes through the second connecting slot $s^1$ into the slot $o^1$ and traverses the same toward the right in four successive movements and finally passes out at $t^1$. The slots $m^1$ and $o^1$ are an angular distance apart equal to the angular distance between neighboring pins $g^1$, so that when a pin has entered the beginning of slot $m^1$ the pin in advance has entered the left end of slot $o^1$. And at the same time a pin $f^1$ is in the slot $q^1$. By this means the wheel $e^1$ is prevented from partaking of any angular movement or angular oscillation during the transverse movements of the shaft $a^1$. The lateral deflections $z^1$ and $z'^1$ at the ends of the slots $x$ and $x'$ where the pins $f^1$ and $g^1$ leave such slots cause in effect a transverse movement of the shaft $a^1$ somewhat in excess of the length of a row of picture units; the first half of this additional transverse movement forces a pin through the first half of a slot $s^1$ causing one half of a rotary step movement of wheel $e^1$, and the return of a pin in the second half of the lateral slot $z^1$ or $z'^1$ causes continued return movement of the pin through the second half of the slot $s^1$ accompanied by the second half of the rotary step movement of the wheel $e^1$. Accordingly a pin, as $f^1$, will leave one slot as $p^1$, pass lengthwise and upwardly through a connection $s^1$ to a slot $q^1$. This curving or slanting connection $s^1$ also renders the apparatus noiseless. If the transfer of a pin from slot $p^1$, for example, to a slot $q^1$ were direct or at right angles to the length of the slot $p^1$, without additional transverse movement, considerable noise would be produced. But by going the roundabout way, through the slanted or curved slot $s^1$, such impact and resulting noise is prevented.

During all this operation of the gear $r$ by the crank $t$ the re-wind reel $v^2$ is frictionally driven and it re-winds the film after it has left the film feeding sprocket $v^1$, as indicated in Fig. 2, the film passing over a suitable idler $c^3$.

As shown in Fig. 9, the variable pitch screw feed member $w$ may have the part with the slot $x$ disposed on one shaft, while the remaining part $w^3$ having the slot $x'$ may be disposed upon a neighboring shaft, in which case one set of pins $f^1$ or $g^1$ only is necessary, and only one half of the member $k^1$ need be used.

What we claim is:

1. In kinetographic apparatus, the combination with a movable film frame, of a laterally movable rotatable member for moving said frame laterally step-by-step and for stepping a film longitudinally, and means for imparting lateral and rotary movements to said member.

2. In kinetographic apparatus, the combination with a movable film frame, of a laterally movable rotatable member for moving said frame laterally step-by-step and for stepping a film longitudinally, and continuously rotating means for imparting lateral and rotary movements to said member.

3. In kinetographic apparatus, the combination with a movable film frame, of a laterally movable rotatable member for moving said frame laterally step-by-step and for stepping a film longitudinally, and a continuously rotating variably pitched screw imparting lateral and rotary movement to said member.

4. In kinetographic apparatus, the combination with a movable film frame, of a laterally movable rotatable member for moving said frame laterally step-by-step and for stepping a film longitudinally, and a continuously rotating cam member for imparting lateral and rotary movements to said member.

5. In kinetographic apparatus, the combination with a movable film frame, of a laterally movable rotatable member for moving said frame laterally step-by-step and for stepping a film longitudinally, and means for locking said frame against lateral movement between its lateral step movements.

6. In kinetographic apparatus, the combination with a movable film frame, of a laterally movable rotatable member for moving said frame laterally step-by-step and for stepping a film longitudinally, and means locking said member against rotary movement during its lateral movement.

7. In kinetographic apparatus, the combination with a movable film frame, of a laterally movable rotatable member for moving said frame laterally step-by-step and for stepping a film longitudinally, continuously rotating means for imparting lateral and rotary movements to said member, and means for locking said frame against lateral movement between its lateral step movements.

8. In kinetographic apparatus, the combination with a movable film frame, of a laterally movable rotatable member for moving said frame laterally step-by-step and for stepping a film longitudinally, continuously rotating means for imparting lateral and rotary movements to said member, and means locking said member against rotary movement during its lateral movement.

9. In kinetographic apparatus, the combination with a movable film frame, of a laterally movable rotatable member for moving said frame laterally step-by-step and for stepping a film longitudinally, a continuously rotating variably pitched screw imparting lateral and rotary movement to said member, and means for locking said frame against lateral movement between its lateral step movements.

10. In kinetographic apparatus, the combination with a movable film frame, of a laterally movable rotatable member for moving said frame laterally step-by-step and for stepping a film longitudinally, a continuously rotating variably pitched screw imparting lateral and rotary movement to said member, and means locking said member against rotary movement during its lateral movement.

11. In kinetographic apparatus, the combination with a movable film frame, of a laterally movable rotatable member for moving said frame laterally step-by-step and for stepping a film longitudinally, a continuously rotating cam member for imparting lateral and rotary movements to said member, and means for locking said frame against lateral movement between its lateral step movements.

12. In kinetographic apparatus, the combination with a movable film frame, of a laterally movable rotatable member for moving said frame laterally step-by-step and for stepping a film longitudinally, a continuously rotating cam member for imparting lateral and rotary movements to said member, and means locking said member against rotary movement during its lateral movement.

13. In kinetographic apparatus, the combination with a movable film frame, of a laterally movable rotatable member for moving said frame laterally step-by-step and for stepping a film longitudinally, continuously rotating means for imparting lateral and rotary movements to said member, and a continuously rotating locking member engaging said member between its lateral step movements.

14. In kinetographic apparatus, the combination with a movable film frame, of a laterally movable rotatable member for moving said frame laterally step-by-step and for stepping a film longitudinally, a continuously rotating cam member for imparting lateral and rotary movements to said member, and a continuously rotating locking member engaging said first named member between its lateral step movements.

15. In kinetographic apparatus, the combination with a movable film frame, of a laterally movable rotatable member for moving said frame laterally step-by-step and for stepping a film longitudinally, continuously rotating means for imparting lateral and rotary movements to said member, and a continuously rotating locking member engaging in successive slots in said first named member between its lateral step movements.

16. In kinetographic apparatus, the combination with a movable film frame, of a laterally movable rotatable member for moving said frame laterally step-by-step and for stepping a film longitudinally, a continuously rotating cam member for imparting lateral and rotary movements to said member, and a continuously rotating locking member engaging in successive slots in said first named member between its lateral step movements.

17. In kinetographic apparatus, the combination with a laterally movable film, of a member for moving said film laterally and longitudinally, and means constantly in engagement with said member for imparting to said member lateral movement and thereafter a movement resulting in longitudinal movement of said film.

18. In kinetographic apparatus, the combination with a laterally movable film, of a member for moving said film laterally and longitudinally, and continuously rotating means constantly in engagement with said member for imparting to said member lateral movement and movement resulting in longitudinal movement of said film.

19. In kinetographic apparatus, the combination with a laterally movable film, of a laterally movable rotatable film feeding wheel engaging said film to move the same laterally and longitudinally, and means constantly in engagement with said wheel for imparting to said wheel lateral and rotary movements.

20. In kinetographic apparatus, the combination with a laterally movable film, of a laterally movable rotatable film feeding wheel engaging said film to move the same laterally and longitudinally, and continuously rotating means constantly in engagement with said wheel for imparting to said wheel lateral and rotary movement.

21. In kinetographic apparatus, the combination with a laterally movable film, of a laterally movable rotatable film feeding wheel engaging said film to move the same laterally and longitudinally, and continuously rotating means constantly in engagement with said wheel for imparting to said wheel step-by-step lateral movements and thereafter rotary movement.

22. In kinetographic apparatus, the combination with a laterally movable film, of a member for moving said film laterally and longitudinally, continuously rotating means for imparting to said member lateral movement and thereafter a movement resulting in longitudinal movement of said film, said means having a variably pitched slot, and a pin on said member engaging in said slot.

23. In kinetographic apparatus, the combination with a laterally movable film, of a member for moving said film laterally and longitudinally, continuously rotating means for imparting to said member lateral movement and thereafter a movement resulting in longitudinal movement of said film, said means having a variably pitched slot, a pin on said member engaging in said slot, and a continuously rotating member engaging in successive slots in said first named member for locking the same between its lateral step-by-step movements.

24. In kinetographic apparatus, the combination with a laterally movable film, of a member for moving said film laterally and longitudinally, means for imparting to said member lateral movement and thereafter a movement resulting in longitudinal movement of said film, and means independent of the driving connection between said means and said member for locking said member between its lateral movements.

25. In kinetographic apparatus, the combination with a laterally movable film, of a member for moving said film laterally and longitudinally, a stationary member engaging said member, and a cam member driving said first named member in successive lateral step movements and at the end of said step movements shifting said first named member with respect to said stationary member to cause rotation of said first named member to feed said film longitudinally.

26. In kinetographic apparatus, the combination with a laterally movable film, of a member for moving said film laterally and longitudinally, a stationary member engaging said member, a cam member driving said first named member in successive lateral step movements and at the end of said step movements shifting said first named member with respect to said stationary member to cause rotation of said first named member to feed said film longitudinally, said stationary member serving to lock said first named member against rotation during its lateral movement.

27. In kinetographic apparatus, the combination with a film, of a member for moving said film laterally and longitudinally, means for imparting to said member lateral movement and thereafter a movement resulting in longitudinal movement of said film, and a stationary member constantly engaging said first named member and locking the same against rotary movement during its lateral movement.

28. In kinetographic apparatus, the combination with a film, of a member for moving said film laterally and longitudinally, said member comprising a pin wheel, a rotary member and a stationary slotted member engaging said pin wheel, said rotary member imparting lateral movement to said pin wheel and shifting said pin wheel with respect to said stationary member to impart rotary movement to said pin wheel.

29. In kinetographic apparatus, the combination with a film, of a member for moving said film laterally and longitudinally, said member comprising a pin wheel, a rotary member and a stationary slotted member engaging said pin wheel, said rotary member imparting lateral movement to said pin wheel and shifting said pin wheel with respect to said stationary member to impart rotary movement to said pin wheel, said stationary member having a plurality of parallel slots connected by a curved or inclined slot.

30. In kinetographic apparatus, the combination with a film, of a member for moving said film laterally and longitudinally, said member comprising a pin wheel, a continuously rotating member having a variably pitched slot in which a pin of said wheel engages, a stationary member having a slot in which a pin of said wheel engages, said continuously rotating member imparting successive lateral step movements to said wheel, said stationary member having parallel slots connected by a curved or inclined slot, said continuously rotating member actuating said wheel to guide a pin thereof through said connecting slot, said pin during passage through said connecting slot rotating said pin wheel through a predetermined angle.

31. In kinetographic apparatus, the combination with a longitudinally movable and rotatable shaft, of film engaging means secured thereto, and means for imparting intermittent longitudinal and rotary movement to said shaft.

32. In kinetographic apparatus, the combination with a longitudinally movable and rotatable shaft, of film engaging means secured thereto, means for imparting intermittent longitudinal and rotary movements to said shaft comprising a cam, and means on said shaft coöperating with said cam.

33. In kinetographic apparatus, the combination with a longitudinally movable and rotatable shaft, of film engaging means secured thereto, means for imparting intermittent longitudinal and rotary movements to said shaft comprising a continuously rotating cam, and means on said shaft coöperating with said cam.

34. In kinetographic apparatus, the combination with a longitudinally movable and rotatable shaft, of film engaging means secured thereto, a pin wheel secured on said shaft, and a cam actuating said pin wheel longitudinally and rotatably.

35. In kinetographic apparatus, the combination with a longitudinally movable and rotatable shaft, of film engaging means secured thereto, a pin wheel secured on said shaft, a cam actuating said pin wheel longitudinally and rotatably, and means locking said pin wheel against longitudinal movement between successive longitudinal movements.

36. In kinetographic apparatus, the combination with a longitudinally movable and rotatable shaft, of film engaging means secured thereto, a pin wheel secured on said shaft, a cam actuating said pin wheel longitudinally and rotatably, and means locking said pin wheel against rotary movement during longitudinal movement.

37. In kinetographic apparatus, the combination with a longitudinally movable and rotatable shaft, of film engaging means secured thereto, a pin wheel secured on said shaft, a cam actuating said pin wheel longitudinally and rotatably, means locking said pin wheel against longitudinal movement between successive longitudinal movements, and means locking said pin wheel against rotary movement during longitudinal movement.

38. In kinetographic apparatus, film controlling means comprising a rotatable and longitudinally movable pin wheel, cam mechanism for actuating said pin wheel, a stationary member having a longitudinally extending slot, and pins on said wheel engaging said cam mechanism and in said slot.

39. In kinetographic apparatus, film controlling means comprising a rotatable and longitudinally movable pin wheel, cam mechanism for actuating said pin wheel, a stationary member having parallel slots connected at their ends, pins on said pin wheel engaging said cam mechanism and in one of said slots, said cam imparting to said pin wheel intermittent longitudinal movements and thereafter a rotary movement, the pin of said pin wheel engaging in said stationary member traversing the connection between said slots during rotative movement of said pin wheel.

40. In kinetographic apparatus, film controlling means comprising a rotatable and longitudinally movable pin wheel, cam mechanism for actuating said pin wheel, a stationary member having parallel slots connected at their ends, pins on said pin wheel engaging said cam mechanism and in one of said slots, said cam imparting to said pin wheel intermittent longitudinal movements and thereafter a rotary movement, the pin of said pin wheel engaging in said stationary member traversing the connection between said slots during rotative movement of said pin wheel, engagement of said pin wheel in said slotted stationary member locking said wheel against rotation during longitudinal movement.

41. In kinetographic apparatus, film combination with a longitudinally movable and longitudinally movable pin wheel, cam mechanism for actuating said pin wheel, a stationary member having parallel slots connected at their ends, pins on said pin wheel engaging said cam mechanism and in one of said slots, said cam imparting to said pin wheel intermittent longitudinal movements and thereafter a rotary movement, the pin of said pin wheel engaging in said stationary member traversing the connection between said slots during rotating movement of said pin wheel, said stationary member being of arcuate form.

42. In kinetographic apparatus, film controlling means comprising a rotatable and longitudinally movable pin wheel, cam mechanism for actuating said pin wheel, a stationary member having parallel slots connected at their ends, pins on said pin wheel engaging said cam mechanism and in one of said slots, said cam imparting to said pin wheel intermittent longitudinal movements and thereafter a rotary movement, the pin of said pin wheel engaging in said stationary member traversing the connection between said slots during rotative movement of said pin wheel, engagement of said pin wheel in said slotted stationary member locking said wheel against rotation during longitudinal movement, said stationary member being of arcuate form.

43. In kinetographic apparatus, the combination with a laterally movable film frame, of a rotatable and longitudinally movable shaft, said shaft rotatable with respect to said frame and connected thereto to move the same laterally upon longitudinal movement of said shaft, and means secured upon said shaft for feeding a film longitudinally.

44. In kinetographic apparatus, the combination with a laterally movable film frame, of a rotatable and longitudinally movable shaft, said shaft rotatable with respect to said frame and connected thereto to move the same laterally upon longitudinal movement of said shaft, means secured upon said shaft for feeding a film longitudinally, a continuously rotating cam mechanism, and means secured upon said shaft and engaging said cam mechanism for imparting said movements to said shaft.

In testimony whereof we have hereunto affixed our signatures in the presence of the two subscribing witnesses.

RICHARD H. PIETZSCH.
ROBERT P. NICHOLS.

Witnesses:
NELLIE FIELD,
A. S. MARSH.